(12) United States Patent
Okita et al.

(10) Patent No.: US 9,344,555 B2
(45) Date of Patent: *May 17, 2016

(54) MAINTAINING HISTORY INFORMATION FOR A USER ACROSS MULTIPLE TYPES OF END POINTS

(71) Applicant: ShoreTel, Inc., Sunnyvale, CA (US)

(72) Inventors: Glen K. Okita, Los Altos, CA (US); Meigy Tsai, San Jose, CA (US); Iouri Achmanov, San Jose, CA (US); Michael S. W. Tovino, Bend, OR (US); AshvinKumar H. Patel, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,066

(22) Filed: Oct. 30, 2014

(65) Prior Publication Data
US 2015/0055511 A1  Feb. 26, 2015

Related U.S. Application Data

(63) Continuation of application No. 12/570,270, filed on Sep. 30, 2009, now Pat. No. 8,903,064.

(51) Int. Cl.
*H04M 3/22* (2006.01)
*H04M 3/42* (2006.01)
*H04M 15/00* (2006.01)

(52) U.S. Cl.
CPC .............. *H04M 3/2218* (2013.01); *H04M 3/42* (2013.01); *H04M 3/42263* (2013.01); *H04M 2203/551* (2013.01)

(58) Field of Classification Search
CPC ....... H04L 41/22; H04L 67/10; H04M 15/00; H04M 15/44; H04M 2201/40; H04M 3/2218; H04M 3/42263; H04M 2203/551; H04M 3/42; H04W 12/08; H04W 12/12

USPC .............. 379/93.01, 121.04, 121.05, 201.03, 379/201.02; 709/217; 370/259

See application file for complete search history.

(56) References Cited

U.S. PATENT DOCUMENTS 6,336,134 B1 * 1/2002 Varma ................. H04L 12/1813
709/201
7,467,210 B1  12/2008 Rao et al.
(Continued)

OTHER PUBLICATIONS

International Search Report and Written Opinion of the International Search Authority for PCT Application No. PCT/US2010/049237 dated Nov. 3, 2010, 7 pages.

(Continued)

*Primary Examiner* — Harry S Hong
(74) *Attorney, Agent, or Firm* — Kilpatrick Townsend & Stockton LLP

(57) ABSTRACT

A system for providing enhanced history information across multiple clients comprises a call application server having a history system, a telephony system and a history cache. The call application server advantageously maintains a history records for each user of the system. The enhanced history system is particularly advantageous because regardless of the endpoint (e.g., phone, thin client, personal call manager or standalone IP phone) with which the user is interacting, the history information specifically for that user is delivered by the call application server to that endpoint. Furthermore, the call application server allows the user to access history information using end points which heretofore were unable to provide history functionality. Finally, the call application server makes the history records universal across all endpoints with which the user interacts, in contrast to prior art, which had limited call history information specific to a particular endpoint.

21 Claims, 14 Drawing Sheets

(56) References Cited

U.S. PATENT DOCUMENTS

| | | |
|---|---|---|
| 8,903,064 B2 | 12/2014 | Okita et al. |
| 2005/0175159 A1 | 8/2005 | Cooper et al. |
| 2008/0155369 A1 | 6/2008 | Takaku |
| 2008/0168183 A1 | 7/2008 | Marcy et al. |
| 2008/0172373 A1 | 7/2008 | Jenson et al. |
| 2008/0175358 A1 | 7/2008 | Huang |
| 2009/0310767 A1* | 12/2009 | Wang ............... H04M 3/42144 379/201.02 |

OTHER PUBLICATIONS

Non-Final Office Action of Jun. 20, 2012 for U.S. Appl. No. 12/570,270, 26 pages.
Final Office Action of Nov. 9, 2012 for U.S. Appl. No. 12/570,270, 13 pages.
Non-Final Office Action of Mar. 20, 2014 for U.S. Appl. No. 12/570,270, 12 pages.
Notice of Allowance of Aug. 4, 2014 for U.S. Appl. No. 12/570,270, 5 pages.

* cited by examiner

MAINTAINING HISTORY INFORMATION FOR A USER ACROSS MULTIPLE TYPES OF END POINTS

CROSS-REFERENCE TO RELATED APPLICATIONS

This application is a continuation of U.S. patent application Ser. No. 12/570,270, filed Sep. 30, 2009, the entire contents of which are incorporated by reference herein for all purposes.

BACKGROUND OF THE INVENTION

The present invention relates to IP telephony systems. More particularly, the present invention relates to systems and methods for maintaining call history for a user across multiple clients. Still more particularly, the present invention related to a system that provides other enhanced call history functions.

Systems that deliver voice communications over the Internet or other packet-switched networks have become common place and are generally referred to as IP telephony systems or Voice over Internet Protocol (VoIP) systems. Such IP telephony systems are particularly advantageous because they reduce the communication and infrastructure costs by routing calls over existing data networks. Such VoIP systems have become even more prevalent because calls can be made using a variety of different types of endpoints. For example, such IP telephony systems provide voice communication and the user has the flexibility to use an IP phone, a soft-phone running on a computer, a thin client such as operating in a web browser, a personal call manager or thick client running on a computer.

Traditional and IP telephony system offer a variety of features such as call forwarding, conference calling, hold, mute, company directory, redial, missed calls, placed calls, voicemail as well as other enhanced features. Some of this functionality is dependent on the particular telephony system, while other functionality is dependent on the capabilities of the telephone or endpoint. One feature that is particularly important is the call history of the user. However, prior art systems only provided call history functionality on IP phones and traditional phones. The history systems of the prior art have been limited to call history and have not allowed management and presentation of other information. Furthermore, the prior art system stored the call history at the IP phones and traditional phones, and thus when a user uses a different endpoint such as a web client their prior call history is not available.

SUMMARY OF THE INVENTION

The present invention overcomes the deficiencies of the prior art with a system and method for maintaining history records for a user across multiple clients. In one embodiment, the system for enhanced history information across multiple clients comprises a call application server, network, a first switch, second switch, a plurality of phones including mobile phones or devices, a thin client, a personal call manager and a standalone IP phone. The call application server is coupled by the network to the first switch, the second switch, the thin client, the personal call manager and the standalone IP phone. The plurality of phones is coupled to the first switch and the second switch. The call application server includes a history system, a telephony system and a history cache. The call application server advantageously maintains history records for each user of the system. The history system couples to a standalone IP phone and the personal call manager to provide call history information upon request. The thin client is coupled to the history system to send requests for history information and to the history cache for receiving history information and notifications. The enhanced history system is particularly advantageous because regardless of the endpoint (e.g., phone, thin client, personal call manager or standalone IP phone) with which the user is interacting, the history information specifically for that user is delivered by the call application server to that endpoint so long as the end point has the capability to display history information. This enables a user to access the history information regardless of the way in which they are accessing the telephony system. Furthermore, the call application server allows the user to access history information using end points which heretofore were unable to provide call history functionality such as mobile devices. Finally, the call application server makes the history records universal across all endpoints with which the user interacts, in contrast to prior art, which had limited call history information specific to a particular endpoint.

The present invention also includes a number of novel methods including a method for collecting and storing historical information, a method for providing history information and a method for history data retrieval.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
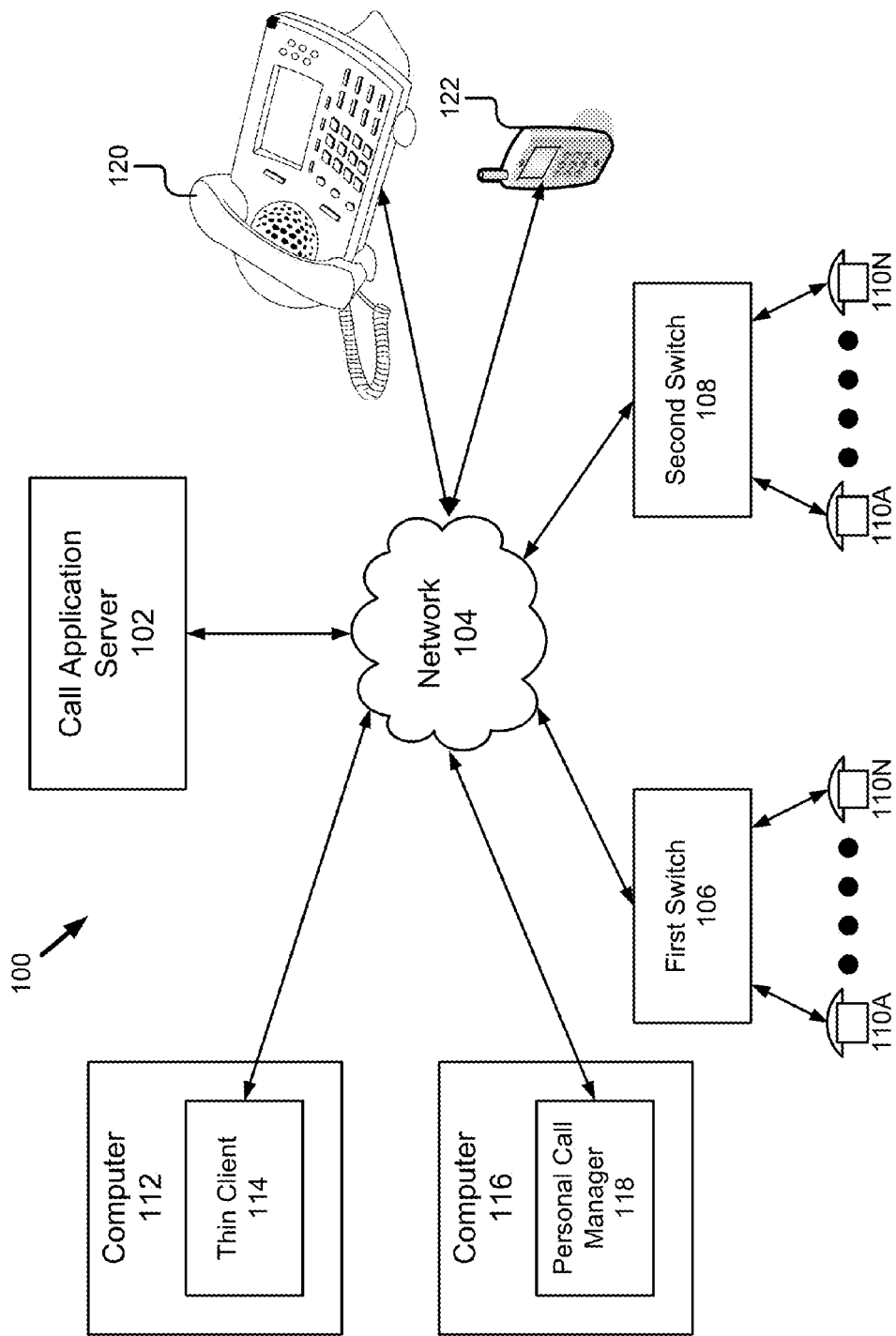
FIG. 1 is a block diagram of an embodiment of a system for enhanced history across multiple clients in accordance with the present invention.

A system and method for maintaining history information for a user across multiple clients is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. The present invention is described in one embodiment below primarily in the context of call history; however, those skilled in the art will recognize that the present invention is applicable to any type of records, lists or real-time status. The system and method of the present invention is applicable to any large server-managed list that needs to be updated in real-time or incrementally. Other examples of history information include a presence-enabled directory, filtered views on a directory (which may be presence-enabled), contact lists with presence, voice mail messages, email messages, instant messages, sessions, conferences, system management lists like phones and trunks in a large system, and real-time status of phone, trunks or switches, such as whether a call is in progress. For the present application, the term "history records" or "history information" is used to refer to any type of history record, real-time status, or lists of other items in a telephony system, unless otherwise specified. In other words, the present invention is a new/unique way to provide clients with a server-side managed list that includes real-time status, incremental updates or of any sort of data.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1 shows an embodiment of a system 100 for enhanced call history across multiple clients. This embodiment of system 100 for enhanced call history across multiple clients comprises: a call application server 102, a network 104, a first switch 106, a second switch 108, a plurality of phones 110A-110N, a computer 112 having a thin client 114, a computer 116 having a personal call manager 118, a standalone IP phone 120 and a mobile device 122 running a mobile call manager. As noted above, the enhanced history system is particularly advantageous because regardless of the endpoint with which the user is interacting, the history information specifically for that user is delivered by the call application server to that endpoint. Furthermore, the call application server allows the user to access history information using end points which heretofore were unable to provide call history functionality. Finally, the call application server makes the call history universal across all endpoints with which the user interacts, in contrast to prior art, which had limited call history information specific to use of a particular endpoint.

While the present invention will now be described with reference to the configuration of the system 100 described above and shown in FIG. 1, those skilled in the art will recognize that the present invention may be operable in a variety of other configurations. For example, there may be more or fewer switches and phones than the first switch 106, the second switch 108 and the plurality of phones 110A-110N. Similarly, another configuration of the system 100 may include additional computers 112, 116 with additional thin clients 114, personal call managers 118 or other thick clients. Yet another configuration may include no computers 112, 116, thin clients 114 or personal call managers 118, or other thick clients. Still another configuration includes no standalone phone 120 or a plurality of standalone phones 120.

The call application server 102 is coupled by the network 104 to the first switch 106, the second switch 108, the thin client 114, the personal call manager 118, the standalone IP phone 120 and the mobile device 122. The plurality of phones 110A-110N are coupled by the first switch 106 and the second switch 108 to the call application server 102. The call application server 102 advantageously maintains history records, in particular call history records, for each user of the system 100. The call application server 102 includes a history system 202, a telephony system 204 and a history cache 206 (See FIG. 2). The history system 202 couples to the standalone IP phone 120, the thin client 114 and the personal call manager 118 to provide call history information upon request. The history system 202 stores history records for the users of the system 100 in the history cache 206 for filtering and easy access. The operation of the call application server 102 will be described in more detail below with reference to FIGS. 2-7.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or include portions of a PSTN or other telecommunications network for sending data in a variety of different communication protocols.

The first switch 106 and the second switch 108 have the same or similar functionality, therefore only the first switch 106 will be described here. The first switch 106 represents a Voice over Internet Protocol (VoIP) device that provides a number of extensions for phones 110A-110N. The first switch 106 is coupled to by the network 104 for communication with the second switch 108 and the call application server 102. The switch 106 is also coupled to the plurality of phones 110A-110N, for example, by the network 104 even though depicted by separate connection lines in FIG. 1. The first switch 106, second switch 108, and plurality of phones 110A-110N may communicate with each other via the signal lines using a LSP protocol. The first switch 106 may also be coupled to the public switched telephone network (PSTN) via an analog or digital trunk line (e.g., a T1 or E1 interface) not shown. The first switch 106 is also coupled to a call manager for controlling the one or more phones with which it is associated. The call manager performs call-related functions such as initiating calls, transferring calls, placing calls on hold, and obtaining caller ID information.

The phones or extensions 110A-110N are conventional IP phones, soft phones or combinations thereof. The phones 110A-110N enables a user to carry on a phone call. The plurality of phones 110A-110N are coupled for communication with the first switch 106 or the second switch 108 as depicted by lines of FIG. 1. While the phones coupled to the first switch 106 and the second switch 108 are identically numbered, those skilled the art will recognize that they represent different pluralities of phones. In one embodiment, the phones 110A-110N are session initiated protocol (SIP) phones. In this one embodiment, when a SIP phone/extension is configured, an extra parameter is included, the port ID. This will be opaque to the switch 106, 108, but will be included in the data passed between the switches 106, 108 in a LSP protocol along with the switch ID. In some embodiments, the phones 110A-110N include a user interface to send data to and receive data from a user. For example, the phones 110A-110N include a Telephone User Interface (TUI) that sends data through a speaker and display and receives data through a microphone and a keypad.

The computers 112, 116 are a conventional type such as personal computer. The computers 112, 116 are coupled to the network 104 for communication with the call application server 102. In one embodiment, the computers 112, 116 access the call application server 102 to a request and receive data for the enhanced call history functionality described throughout this application. For example, a user may request enhanced call history information using the thin client 114, a thick client or the personal call manager 118; and the call application server 102 returns enhanced call history information that can be displayed by the computers 112, 116. Those skilled in the art will recognize that the computers 112, 116 may include other programs or applications that retrieve other call history information stored in and made available by the application server 102.

The thin client 114 is client software that interacts with the call application server 102. The thin client 114 focuses on conveying input and output between the user and the call application server 102. In one embodiment, the thin client 114 is a web application. In another embodiment, the thin client 114 allows the enhanced call history information received from the call application server 102 to be sorted and presented in a variety of different formats as will be better understood with reference to FIGS. 8-13 below.

The personal call manager 118 or thick client is an application program operable on the computer 116 to provide a variety of telephony functions. In one embodiment, the personal call manager 118 is similar to the personal call manager manufactured and sold by Shortel, Inc. of Sunnyvale Calif. but modified to include the enhanced call history functionality described throughout this application.

Call Application Server 102

Figure 2:
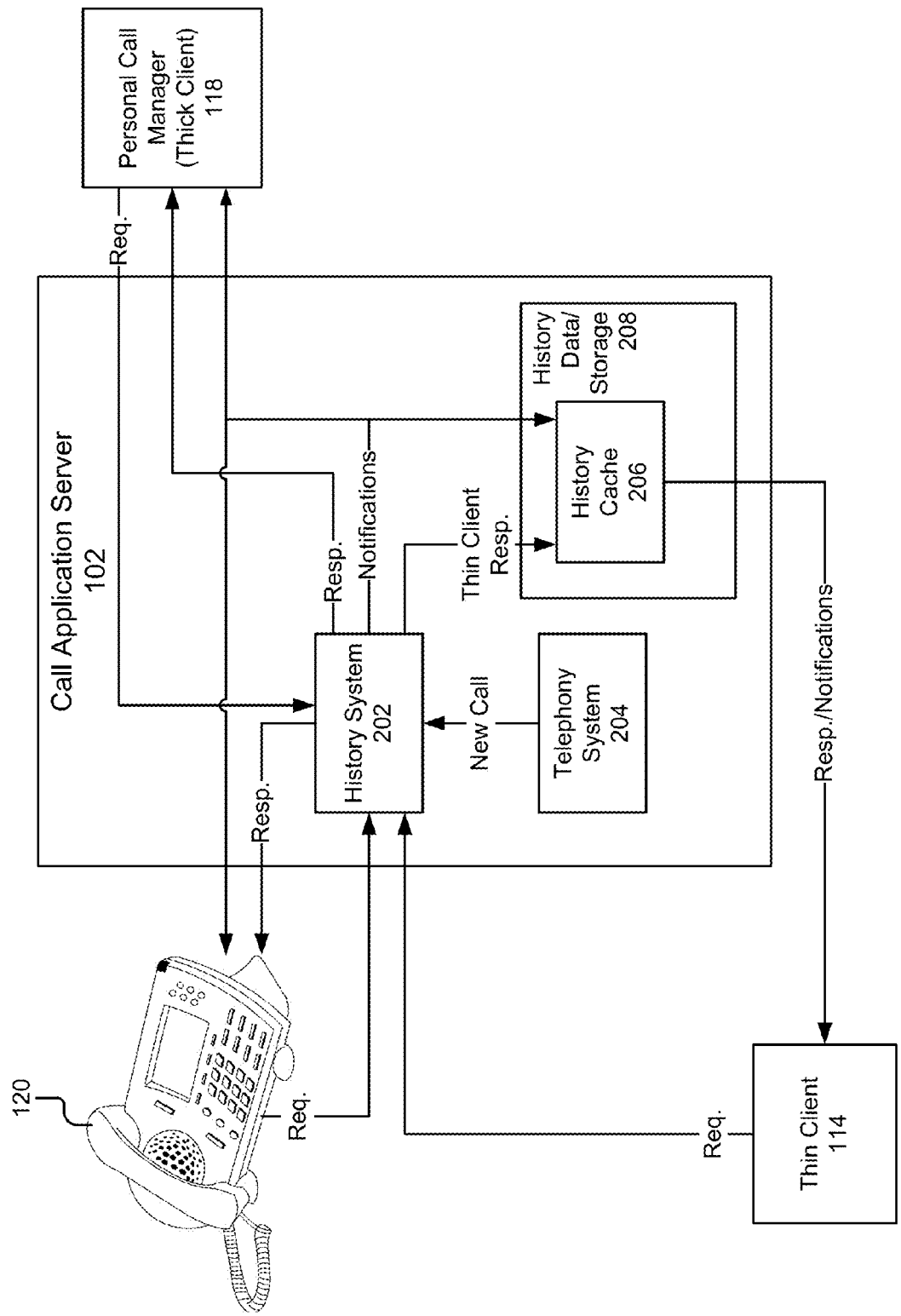
FIG. 2 is a block diagram of an embodiment of a call application server in accordance with the present invention.

Referring now to FIG. 2, an embodiment of call application server 102 is described in more detail. The call application server 102 comprises a history system 202, a telephony system 204 and a history data/storage having a history cache 206. Although not shown in FIG. 2, the call application server 102 may also include other systems such as but not limited to a voicemail system, an instant messaging system and other systems as will be understood by those skilled in the art. The personal call history in accordance with the present invention is server based and is recorded regardless how the user accesses the system 100 to make calls. The call application server 102 is particularly advantageous because it is adapted to communicate with a variety of different types of clients or client devices. A single user may use different devices or interface to access the history information depending on factors such as the location. For example, the call history can be accessed from the personal call manager 118 running on Windows, from a web-based personal call manager, from a standalone phone 120 or from a mobile call manager running on a mobile device 122 such as a Blackberry. The call application server 102 provides this functionality because it is capable of receiving requests for history information from any type of device and sending out notifications and response information to any type of device.

FIG. 2 illustrates one embodiment of the call application server 102 simplified to show the interaction between the call application server 102 the endpoints 114, 118 and 120 in two ways. First, the call application server 102 interacts with either the standalone phone 120 or the personal call manager 118 in a non-page view way in which the endpoints 118, 120 send requests to the call application server 102, in particular the history system 202, and receives responses and notifications. Second, the call application server 102 interacts with thin client 114 in a page view method in which the thin client 114 sends requests to the history system 202 and in response receive responses and notifications via the history cache 206.

Although not shown in FIG. 2, those skilled in the art will recognize that the call application server 102 includes a processor, memory and communication unit. The processor comprises an arithmetic logic unit, a microprocessor, a general purpose controller or some other processor array to perform computations, provide electronic display signals to display device, and perform the call history processing of the present invention. The processor is coupled to a bus for communication with the other components of call application server 102. The processor processes data signals and may comprise various computing architectures including a complex instruction set computer (CISC) architecture, a reduced instruction set computer (RISC) architecture, or an architecture implementing a combination of instruction sets. It will be understood to one skilled in the art that other processors, operating systems, sensors, displays and physical configurations are possible. The call application server 102 also includes an operating system executable by the processor such as but not limited to WINDOWS®, MacOS X, or UNIX® based operating systems.

The memory stores instructions and/or data that may be executed by the processor. The instructions and/or data may comprise code for performing any and/or all of the techniques described herein. The memory may be a dynamic random access memory (DRAM) device, a static random access memory (SRAM) device, flash memory or some other memory device known in the art. In one embodiment, the memory also includes a non-volatile memory such as a hard disk drive or flash drive for storing call history information on a more permanent basis. The memory is coupled by a bus for communication with the other components of the call application server 102.

The communication unit is coupled to the processor, memory, the history system 202, the telephony system 204 and the history cache 206. The communication unit links the processor to the network 104 and other processing systems. The communication unit also provides other conventional connections to the network 104 for distribution of files using standard network protocols such as TCP/IP, HTTP, HTTPS and SMTP as will be understood to those skilled in the art. In an alternate embodiment, the communication unit is coupled to the network 104 or data storage by a wireless connection and the communication unit includes a transceiver for sending and receiving compound documents. In such an alternate embodiment, the communication unit includes a Wi-Fi transceiver for wireless communication with an access point. In yet another embodiment, the communication unit includes ports for wired connectivity such as but not limited to USB, SD, or CAT-5, etc.

The history system 202 is software and routines for receiving requests for history information, in particular call history, and outputting responses and notifications. In one embodiment, the responses include the call history information that is displayed by the requesting end point. The history system 202 provides a variety of interfaces for coupling with the thin client 114, the personal call manager 118 and the stand alone IP phone 120. Those skilled in the art will recognize that the thin client 114, the personal call manager 118 and the stand alone IP phone 120 are used here merely as three example interfaces to which the history system 202 couples and communicates. In alternate embodiments, the history system 202 is adapted to receive requests from and send responses and notifications to a variety of other types of devices such as a mobile call manager or other type of endpoint. Furthermore, it should be understood that the call application server 102 may be coupled to any number of endpoints of any type even though only one of each type is shown in FIG. 2 and there are only three types.

As shown in FIG. 2, the history system 202 is coupled to the stand alone IP phone to receive requests and send responses and notifications directly. The history system 202 is also coupled to receive requests from the personal call manager 118 and send responses and notifications to the personal call manager 118 directly. Finally, the history system 202 is also coupled to receive requests from the thin client 114. The history system 202 is coupled to the telephony system 204 to receive information about new calls that have been made. The telephony system 204 provides the history system 202 with information about calls made using the VoIP system including information necessary to create a history record. In one embodiment, this information includes parties to the call, user ID, starting time of the call, duration, trunk information, account code information, account code name, whether the call was secured not, message ID of a voice message is left, routing slip, and a time label. In another embodiment, the history system 202 is coupled to the telephony system 204 or other system (voicemail or instant messaging system) to receive enhance call information that can be part of the history record. Example of enhance call information include voicemail information, instant messaging information, presence information, email information, directory information, contact information, missed call information, received call information, management data, network status and other status data. Upon receiving new call information from the telephony system 204, the history system 202 creates a history record and stores the history record. Finally, the history system 202 is coupled to the history cache 206 to store and filter history data provided in responses and notifications to thin clients 114. Those skilled in the art will recognize that while the IP phone 120 is shown as being directly coupled to history system 202, in other embodiments, the IP phones and mobile endpoints include and use a thin client 114 to access the system 100. Thus, the thin client 114 includes a variety of configurations beyond just a client in a Web browser.

The telephony system 204 is a conventional VoIP system as known in the art. The telephony system 204 includes the ability to output call information such as was described above with reference to the history system 202. In one embodiment, the telephony system 204 is the telephony subsystem of an overall VoIP system. The telephony system 204 is coupled to provide new call information to the history system 202. Those skilled in the art will recognize that the telephony system 204 is representative of an existing data system that provides a list of history records and information, and that it could also include an instant messaging system to provide a chat history or any other additional system such as email or voice mail.

In one embodiment, the history data/storage 208 is a controller and a combination of persistent and non-persistent storage including the history cache 206. The history cache 206 is memory cache of a conventional type. The memory cache 206 provides a storage area for storing call history information so that it is available to the thin client 114. In another embodiment, the history cache 206 includes the persistent storage such as a flat file database for storing history records. Since the thin client has limited computational resources, the use of the history cache 206 allows the history information, for example call history, to be manipulated and displayed in the same way that can be done for the other types of client devices. The history cache 206 is particularly advantageous because it provides the thin client 114 and the thick client 118 with a view into a sorted history list. Having this view allows the call application server 102 to filter events to the clients 114, 118 so the clients only gets events for the records they needs/are viewing. Having this view on the call application server 102 saves the thin and thick clients 114, 118 from having to perform complex view management which some thin and thick clients 114, 118 will not be able to do and doing it this way also provides data efficiently in terms of network traffic. The history cache 206 stores responses and notifications received from the history system 202. In another embodiment, the history cache 206 is augmented to provide additional real-time information such as presence information for the portion of the history currently being displayed. The presence information is very useful in the history to assess, for example, whether it is worthwhile to return a phone call. The presence information is very dynamic and the history cache 206 provides a scalable solution to providing this information to clients. In yet another embodiment, the history cache 206 stores a call cell similar to that shown and described below with reference to FIG. 13. This allows the call history interface to be used to access the functionality of the IP telephony system such as but not limited to making a phone call, accessing instant messaging, accessing e-mail or detecting presence. The history cache 206 can be better understood with the following description and with reference to FIG. 3 below.

Page Views

Figure 3:
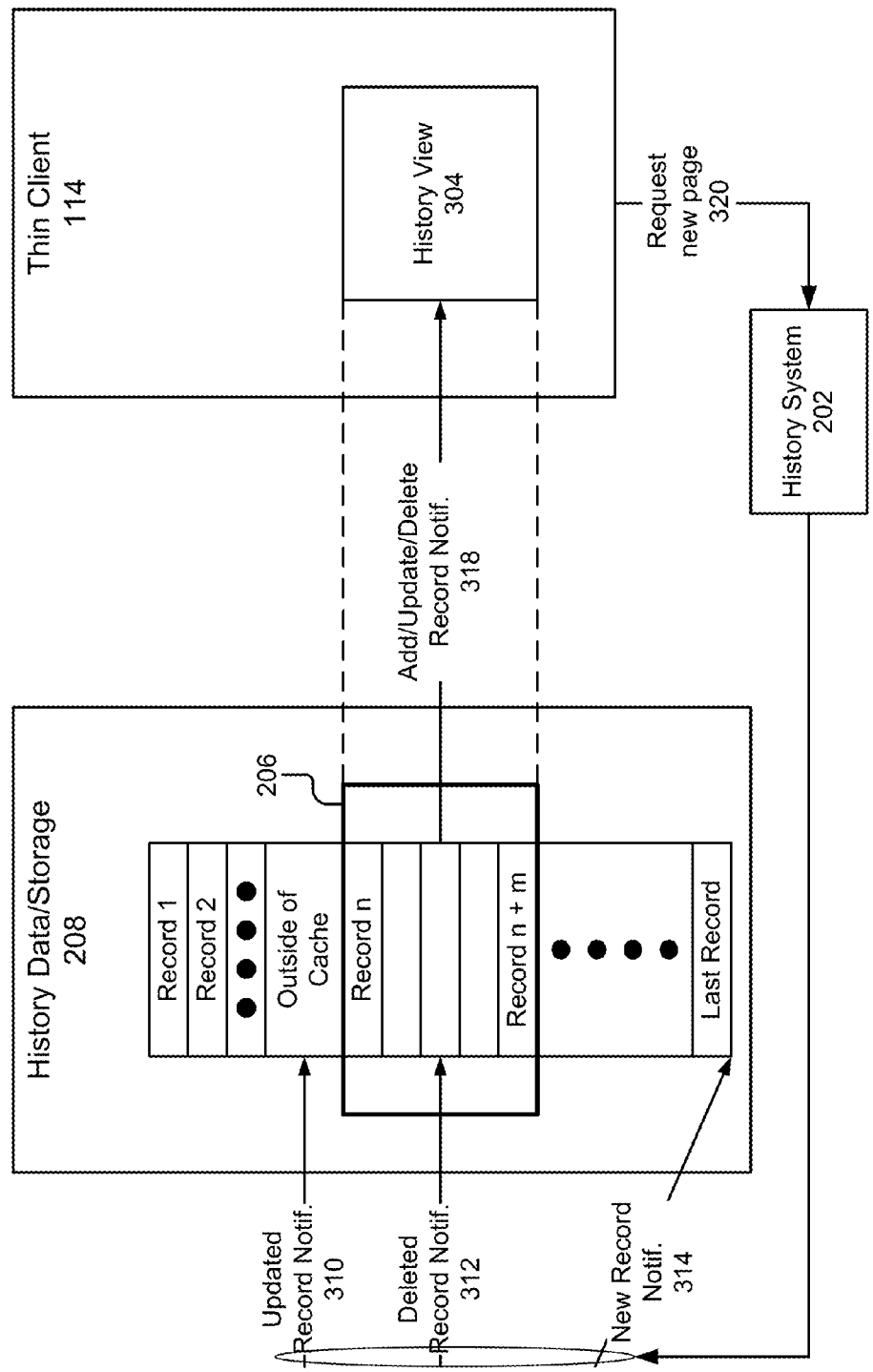
FIG. 3 is a block diagram of an embodiment of a history cache and client in accordance with the present invention.

Referring now to FIG. 3, the use of the history cache 206 and its interaction with the thin client 114 and the history system 202 will be described in more detail. The history cache 206 is provided to track and update history information at the call application server 102 instead of the thin client 114. This is particularly advantageous because it moves the burden of processing the history information from the thin client 114 to the call application server 102. This allows the thin client 114 to be able to display history information and use the other enhanced call history functionality where this was not possible in the prior art. For each request that has been received by the history system 202 from the thin client 114, the history cache 206 is updated to store a plurality of history records that are likely to be accessed by the thin client 114. This plurality of records are provided to the thin client via the history system 202, maintained in a page view in the history cache 206, and are presented in a history view 304 by the thin client 114. Those skilled in the art will recognize that at a given time the call application server 102 is in communication with more than one thin client 114 even though only a single thin client 114 is shown in FIG. 3. Thus, if the call application server 102 has received requests from several thin clients 114, a page view is stored in the history cache 206 for each thin client 114. It should be noted that the page view stores the records based on sorting order requested by the thin client 114 which may be different from the order in which history records are stored in the history cache 206. For example, the history cache 206 stores records in order rec1, rec2, rec3 . . . , but the page view stores the records in the order they appear to the thin client 114 such as rec2, rec3, red 1 . . . which is different.

The history cache 206 communicates with the history system 202 to receive history records in response to a given request from the thin client 114. In response to a request from the thin client 114, the history system 202 identifies the user associated with the thin client 114 and retrieves history records, such as call records, for that user. In particular, in response to a request, the history system 202 retrieves a plurality of records sufficient for the page view and stores them in the history cache 206. These retrieved records are then sent to the history cache 206 so that they are accessible to the thin client 114. Thus, the history cache 206 serves the function of storing the data for filtering updates later. The history cache 206 cache almost mirrors the records the user sees in the history view 304 at the thin client 114 such as in the browser. In another embodiment, the history cache 206 includes only partial data from each history record, namely, the columns upon which the thin client 114 is allowed to sort. In other words, the history cache 206 may not be an exact copy of the client data in the history view 304.

Once a page view has been stored in the cache 206, the history system 202 interacts with the telephony system 204 to receive real-time call information. In response to the real-time call information, the history system 202 updates the information in the history cache 206 as necessary. In particular, the history system 202 sends various types of notifications and responses to the history cache 206. For example, the history system 202 sends an updated record notification 310, a deleted record notification 312 or a new record notification 314 to indicate different types of real-time changes in the call history information. An updated record notification 310 is used to indicate that a history record has been modified, for example where the history cache 206 tracks presence, the update record notification may indicate a change in presence. The delete record notification is used to indicate that a record has been deleted from the call history stored by the history system 202. If such notification is received by the history cache 206, the history cache 206 adds, updates or deletes the corresponding record from the cache and the history system 202 sends an add, update or delete record notification 318 to the client 114 (This passes through the history system 202 although not show as such in FIG. 3 for ease of understanding of the correspondence between the page view and the history view 304). The new record notification 314 is used by the history system 202 to signal a new record for one of the users being tracked in the history cache 206 has been created. The history cache 206 in response to the new record notification 314 adds the new record at a location after the last record in the history cache 206. The history system 202 receives requests for new pages 320 from the thin client 114. In response to the new page request 320, the history system 202 provides a new page view of history records. The history system 202 processes the request, retrieves new records if necessary, and updates the history cache 206. For example, the thin client 114 tells history system 202 about current offset and number of record (page view) to load from the history cache 206. For example, the new page request 320 may be issued by the thin client 114 to retrieve additional history records when a user has input a command to scroll up, scroll down, or switch between a received call list and a place call list. In one embodiment, the history cache 206 stores the records n to n+m as shown. The history cache 206 also includes a data structure (not show) such as a master list with each entry in the list corresponding to one of the m records stored in the history cache 206 and this is part of the history view 304. In response to input from the user, the data structure or list can be re-sorted or filtered (not shown). Such a command causes the page view to be regenerated such that the m records that are part of the history view 304 are stored in the history cache 206. Additionally, the master list is update to reflect the sorting or filtering applied and the new m records store in the regenerated page view. For example, an original page view may contain all the calls received by a user. The thin client 114 may then request that the list in the history view 304 be only those calls received from a particular caller and sorted by time. This would cause the history cache 206 to filter the records stored to only those from that particular caller and in reverse order based on time when the call was received. This is done by regenerating the page view by using those criteria, and reproducing the master list. Then record updates and notifications are sent from the history system 202 to the thin client 114 to make the history view 304 match the regenerated page view.

As noted above, the history cache 206 and the history system 202 cooperate to provide history information on a real-time basis. Providing personal call history for some interfaces, such as the web client, has not been possible in the prior art. Particularly for real-time applications that require more memory and processing, the constrained environment of a web browser application has not allowed access to enhanced call history information, particularly on a real-time basis. However, the history cache 206 of the present invention allows the thin client 114 (e.g., web browser application, IP phone, etc.) to sort the call history information on a variety of columns such as by name, number, start time, etc. This is advantageous because the processing has been moved to the call application server 102 with server side pagination that also operates without polling so that a client's call history is updated as soon as a call ends. Those skilled in art will recognize that the interaction between the history cache 206 and the thin client 114 may be used in a similar fashion for other interfaces such as voicemail viewing and contact management, in particular as it relates to instant messaging buddy lists, where there can be a large number of entries that needs to be sorted by different criteria and it's important that updates be received immediately.

Caching of history on server-side (in the call application server 102) is also advantageous because it allows browsing of big datasets in the thin client 114 without incurring significant memory consumption. In this embodiment, the thin client 114 is mainly responsible for maintaining row selection and scrolling. As soon as the user scrolls out of visible range, the thin client 114 asks the call application server 102, in particular the history system 202, for a new page of data. The same request is issued by thin client 114 in case of a user selecting a new sorting order. In one embodiment, the page size is relatively small compared to whole dataset stored in the history system 202, and the call application server 102 serves it quite quickly. In another embodiment, the retrieved records are stored in history cache 206 in abbreviated form. The history cache 206 is in fact a virtual window into the larger history. The call application server 102 starts to filter the events about new, updated and deleted history records that keep coming during server runtime. Each time such a virtual window is affected by a change, the caching mechanism of the history system 202 generates an event to thin client 114 and updates the content of history window. This method advantageously reduces the reduce amount of traffic between call application server 102 and the thin client 114, centralizes sorting of data on server-side and lower complexity of code in the thin client 114. In yet another embodiment, the requests from the thin client 114 to the history system 202 include "history weights" of some values related to history record. This allows the thin client 114 to control sorting order for some columns on the call application server 102 and hence same history can be sorted correctly in different languages (e.g. by call type From/To/Missed/Transferred).

Methods

Figure 4:
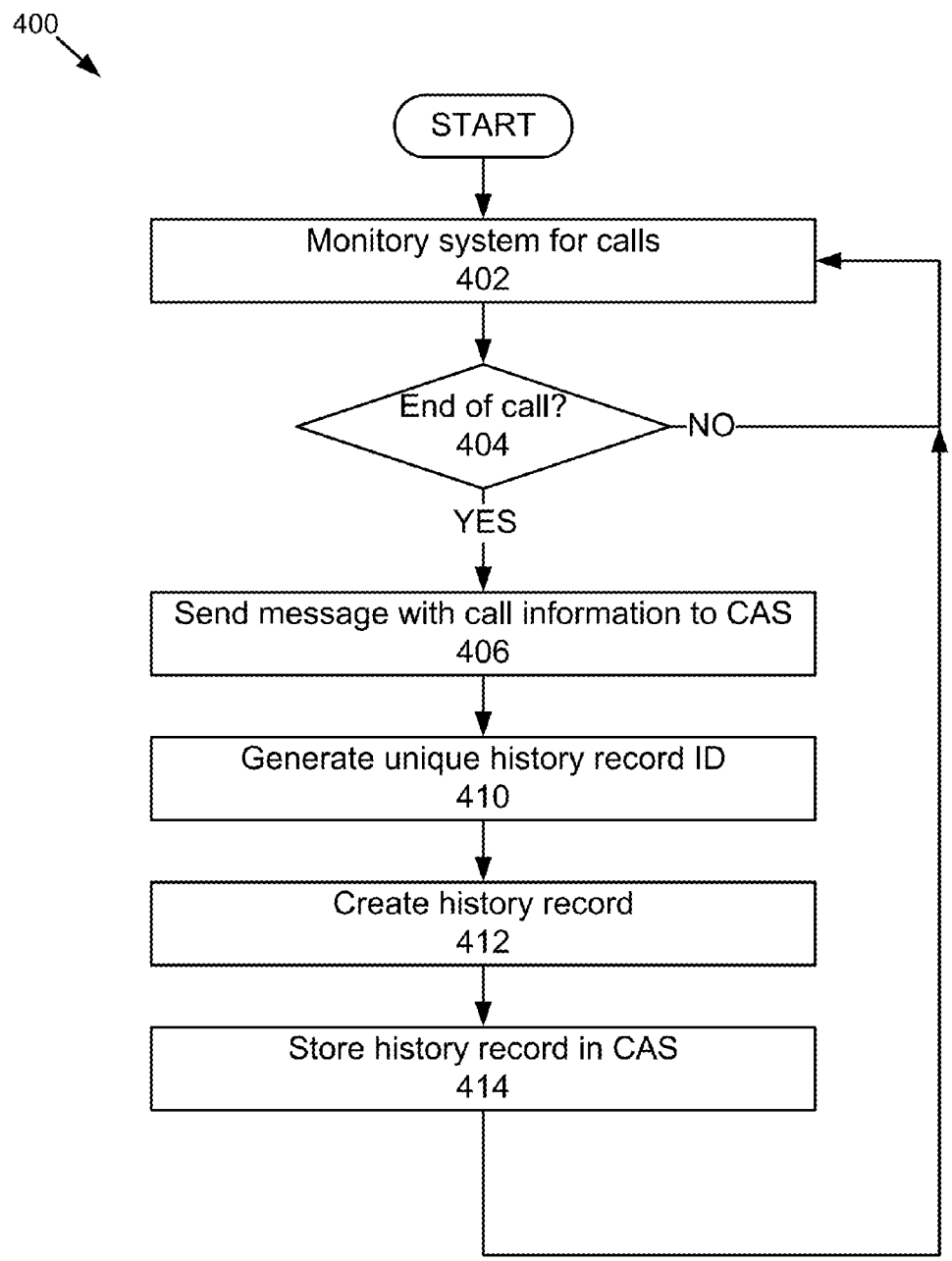
FIG. 4 is a flowchart of an embodiment of a method for collecting history information and creating history records in accordance with the present invention

Referring now to FIG. 4, an embodiment of a method 400 for collecting call history information and creating history records in accordance with the present invention will be described. The method begins by monitoring 402 the IP telephony system for new calls. While the method is described here in the context of a single call, it should be recognized that at any given point in time the call application server 102 is monitoring numerous calls being handled by the telephony system 100 and not just a single call. In one embodiment, this is performed by the telephony system 204 and it monitors for any new calls that have been initiated and tracks them. Then the TAPI (not shown) of the system 100 determines 404 whether the call has ended. If the call has not ended, the method returns to step 402 and continues to monitor the call. However, if the call has ended, the method with the TAPI of the system 100 sending 406 a message to the telephony system 204 of the call application server 102. The telephony system 204 in turn generates a signal and sends it to the history system 202. The message sent from the telephony system 204 to the history system 202 includes the information needed to populate the fields of the history record. Once the method has detected the end of a call, the information for that call is added as a record in the history system 202. The method next generates 410 a unique history record identification number. This unique identification number is used by the history system 202 to uniquely identify the history record. Next, the history system 202 creates 412 a history record including the unique identification number generated in step 410 and the information for various fields from step 406. As noted above, the information for the history record includes a record ID, a call ID, a record type, a call start time, a call duration, a time label, a note, a trunk identifier, and account code, a account code name, a security value, a message identifier, a list of one or more parties, a routing slip and a time of creation for the history record. Those skilled in the art will recognize that this is just a list of example data, and that the history record may include more or fewer fields from those identified above. For example, the history record may include real-time presence information, voicemail information, instant messaging information, etc. The collection process is completed by storing 414 the history record in the call application 102. In one embodiment, the history system 202 includes disk storage or other type of nonvolatile media and the history records are stored onto disk. In another embodiment, storing a new record as in step 414 triggers deletion of oldest record(s) if history cache 206 has reached the limit of allowed number of records. Moreover, the addition or deletion of records from the history cache 206 triggers corresponding notifications to the clients 114.

While the above method has been described in the context of calls made by a user to collect information relating to the call history, those skilled in the art will recognize that a similar process is followed to collect other history information in real time for the user such as but not limited to: 1) the number for calls made to the user's extension; 2) voice mails in the inbox of the user or logs of voice mails; 3) present information such as telephony presence information, location-based presence (GPS) information, wireless presence (Bluetooth, RFID, etc.) information; 4) management real-time data for phones, switches, etc. such as active calls, error counts (e.g. high water mark), memory or CPU consumption, services status (up/down), network connectivity (up/down), HW status (error/failure), network bandwidth used or available, ports in use, in or out of service, and routing status (by time-of-day/holiday, CHM); 5) logs of instant messages; etc. Furthermore, in another embodiment these types of information about disparate type of communication are integrated and presented to the user in a comprehensive view of all communications with or for a particular party.

Figure 5:
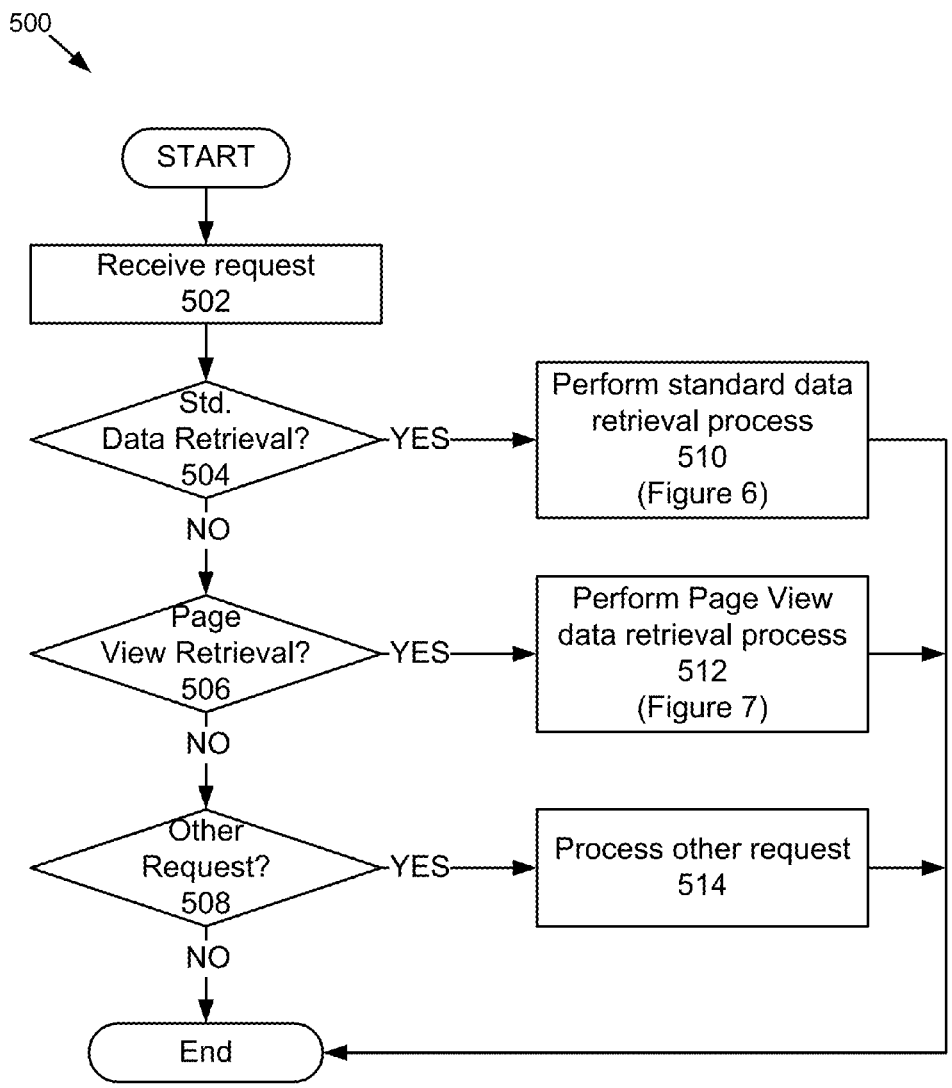
FIG. 5 is a flowchart of an embodiment of a method for providing history information in accordance with the present invention.

Referring now to FIG. 5, an embodiment of a method 500 for providing call history information in accordance with the present invention will be described. FIG. 5 illustrates a general method 500 for providing call history information. The method 500 begins by receiving 502 a request from a client or IP phone. The client may be a thick client, the thin client, a standalone IP phone or a conventional IP phone. In one embodiment, the request is received by the history system 202 of the call application server 102. Next, the call application server 102 determines 504 whether the request is for a standard data retrieval. In standard data retrieval, the call application server 102 retrieves the information and delivers it to the client but is not responsible for any further updating or management of the information. If so, the method performs 510 a data that retrieval process and delivers the requested information to the requesting device. The standard data retrieval processes is for the personal call manager 118 or similar type device that has the computational capability to manipulate, manage and present the data in a graphic user interface. One embodiment of such a standard data retrieval processes is disclosed and described below with reference to FIG. 6. After delivering the data, the method is complete and ends.

On the other hand if the method determined that it was not a standard data retrieval request in step 504, the method continues by determining 506 whether the request was for a page view retrieval of data. As has been described above with reference to FIGS. 2 and 3, a page view data retrieval utilizes the history cache 204 and the call application server 102 is responsible for storing and updating real-time data related to the request in the history cache 204. If the request is determined in step 506 to be a request for page view retrieval of call history data, the process performs 512 the page view data retrieval. One embodiment for the page view data retrieval processes described below with reference to FIG. 7. After the data has been retrieved and stored in the history cache 206, the method is complete and ends.

On the other hand, if it was determined in step 506 that the request was not for a page view retrieval of data, the method continues to determine 508 whether the request was another type. If not, the method is complete and ends. However if the request was another type that the call application server 102 can service, the method continues to step 514 and processes the request. The call application server 102 is able to process various other requests beyond the standard data retrieval request and the page view retrieval request. For example, the call application server 102 process other requests such as: 1) a retrieve history request which retrieves the number of history records for a given user; 2) a delete history record request which deletes a specific set of history records for a user from storage of the history system 202; 3) a delete all history records request which deletes all history records stored by the history system 202; 4) an update history record call note which updates the call note on a particular history record; and 5) a close history page request which closes the history cache 206 of the history page. Those skilled in the art will recognize that the above list of other request is provided merely by way of example and that various other requests for other enhanced call history information may be processed by step 514. After step 514 the processing is complete and the method ends.

Figure 6:
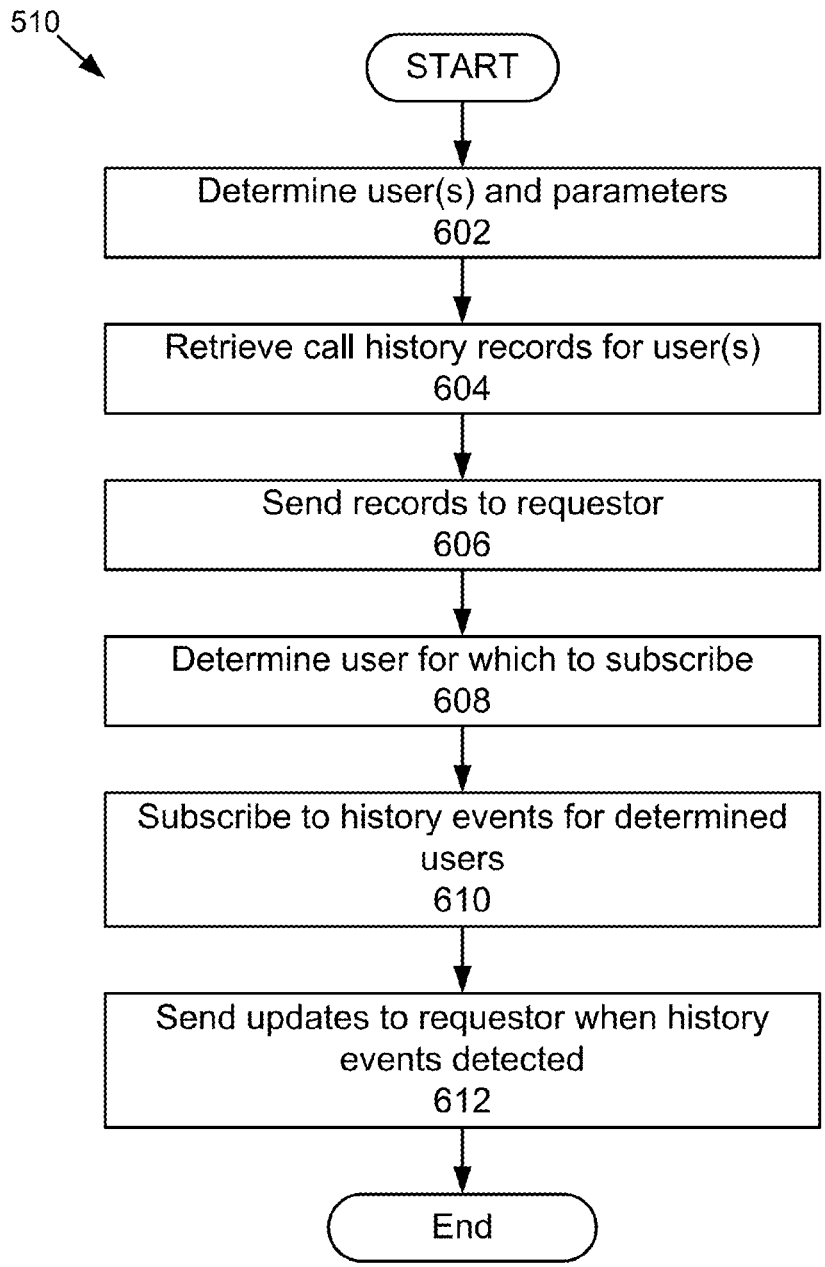
FIG. 6 is a flowchart of an embodiment of a history data retrieval process in accordance with the present invention.

Referring now to FIG. 6, an embodiment of a call history data retrieval process 510 is described. The process begins by determining 602 the user and other parameters associated with the request to retrieve call history information. In most cases, this information will be provided as part of the request. Next, the method retrieves 604 the call history records for the users identified in step 602 and filters them by the parameters provided in step 602. In particular, the history system 202 uses the information from step 602 to generate a query and applies that query to the history records stored on disk by the history system 202. Then the method completes by sending 606 the records to the client device or IP phone from which the request was received (Step 502 of FIG. 5).

While the subscription and data retrieval for non-paged requests are shown in FIG. 6 as being sequential steps in FIG. 6, those skilled in the art will recognize that subscription and data retrieval for non-paged requests are completely independent from step 602-606 and the order shown in FIG. 6 is not limiting. This is shown with a dashed line between step 606 and 608. In fact, the subscription 610 and updating 612 may be preformed at any time independent of the steps 602-606 and need not be related to the standard retrieval process 510. They are described below as part of FIG. 6 merely for convenience and ease of understanding as one example of the present invention.

In another embodiment, the history system 202 of the call application server 102 provides additional information (e.g., real time updates) about a call history if a subscription request is also received by the call application server 102. If a subscription request is received all changes to a user's history will be communicated to the client device that submitted the request using events. In this embodiment, the method continues by determining 608 a user corresponding to the subscription request. Then the history system 202 subscribed 610 to history events for the user determined in step 608. As history events are detected and received by the history system 202, they are automatically sent 612 as update events to the requester. Although not shown, the method can continue to monitor and send detected events to the requester until a request for ending the subscription is received by the history system 202.

Figure 7:
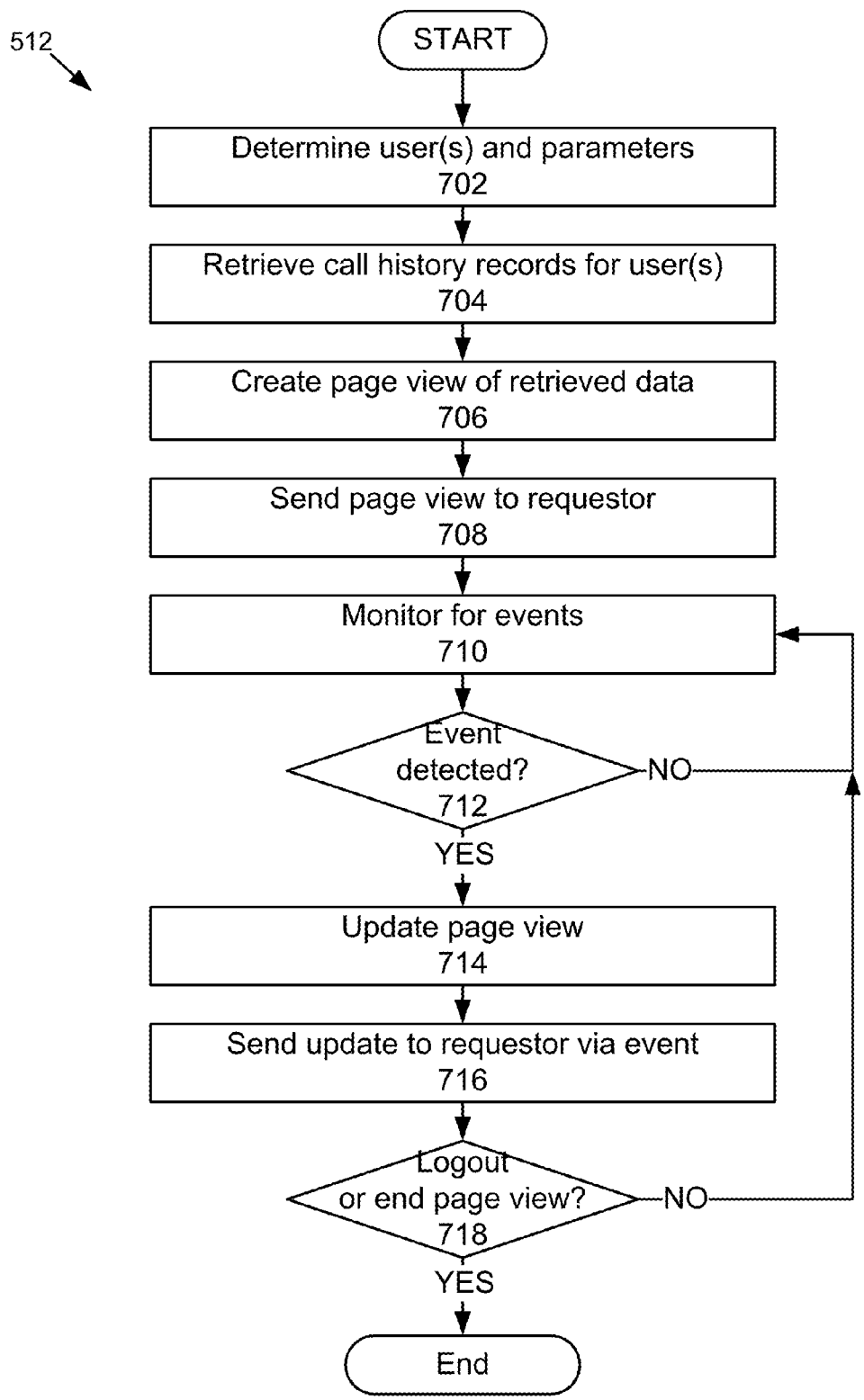
FIG. 7 is a flowchart of a second embodiment of a history data retrieval process in accordance with the present invention.

Referring now to FIG. 7, an embodiment of a page view data retrieval process 512 is described. The method begins by determining 702 the user and parameters associated with the page view retrieval request. As noted above, this information will typically be included as part of the retrieval request (See step 502 of FIG. 5). Next, the method continues by retrieving 704 the call history records for the user identified in step 702. This is similar to step 604 described above. However, in this embodiment, the retrieved call history records are also stored in the history cache 206. Next, the history system 202 creates 706 a page view of the retrieved data in the history cache 206. The history records in the created page view are then sent 708 to the requesting device, e.g., the thin client 114.

Then the history system 202 monitors 710 for events related to any records of the determined user. For example, there are a variety of different types of events that may occur in history system 202 such as: 1) item changed event which indicates that information about a history record has changed; 2) history item delete event which indicates that a history event has been deleted from the call application server; 3) all history items deleted event which indicates when all history events are deleted from the server; 4) all history updated event which indicates that the local history for a user has undergone a massive update such as after the user is moved from one server to another; 5) page item changed event which indicates either an item on a current page has been modified or new item has been created which would fall onto the current page; 6) page item deleted event which indicates when an item on the current page has been deleted; and 7) page close event which indicates that a page is no longer valid either because the users history was moved from one server to another or because all items on the page or deleted. Those skilled in the art will recognize that the above list of events is provided merely by way of example and that various events may be monitored and detected.

Next, the method determines 712 whether an event was detected before a timeout has occurred. If not or a time out occurred, the method returns to step 710 to monitor for events that affect the user whose history records are stored in the cache 206. The monitoring continues until the page view is closed or the subscription is ended. If an event was detected in step 712, the method determines the event that was detected, processes the event, and updates 714 the page view. Next, an update is sent to the requester by sending an event from the history cache 206 to the requester, thin client 114. Next the method determines whether the user is logged out or an end a page view request has been received by the history system 202. If so, the page view can be flushed from history cache and the method ends. If not, the method returns to step 710 to monitor for additional events.

Figure 8:
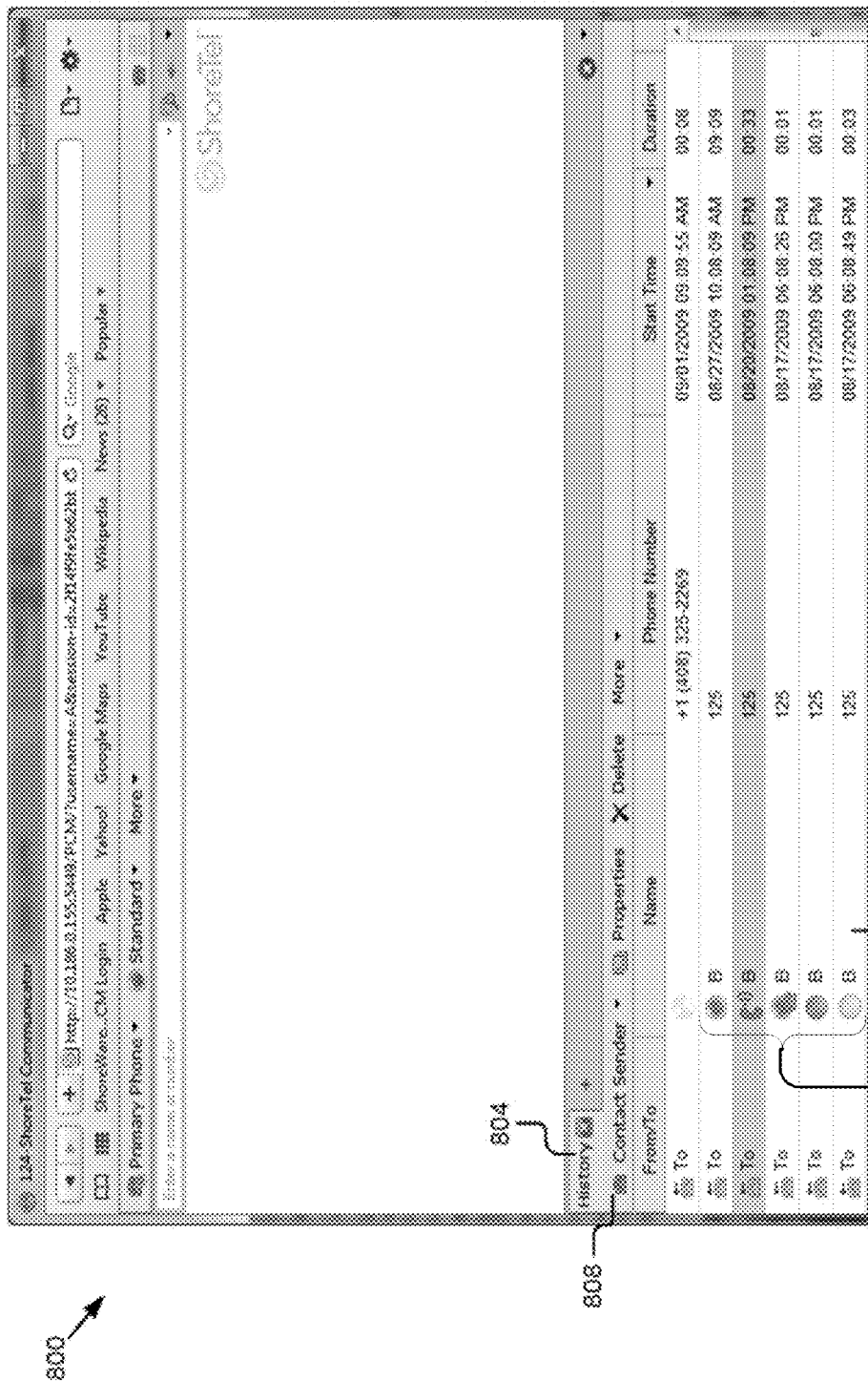
FIGS. 8-13 are graphic representations of a display device showing a graphic user interface for displaying call history data and other enhanced information and functionality in accordance with the present invention.

Referring now to FIGS. 8-13, the graphic user interface 800 displayed on the thin client 114 and provided by the cooperation of the call application server 102 with the thin client 114 as described above is shown. The graphic user interface 800 includes a window 802 for managing call information. The window 802 includes a tab 804 for showing call history information; in particular, a table 806 of call history records that displays the values stored in corresponding fields of the call history records. The graphic user interface 800 also includes a plurality of action buttons 808 for taking action on a selected history records such as contacting the sender by initiate a return call, the deleting a history record, showing the properties of the history record etc. As also shown in FIG. 8, the window 802 includes a series of icons 810 that are updated to reflect the current status of the user identified by the row in the table 806. Various different icons 810 are used to indicate the user's presence on the system 100, that the user is using the phone, that the user is present for instant messaging, that the user has voice mail, or that the user is not available or a variety of other real-time status information about the user.

Figure 9:
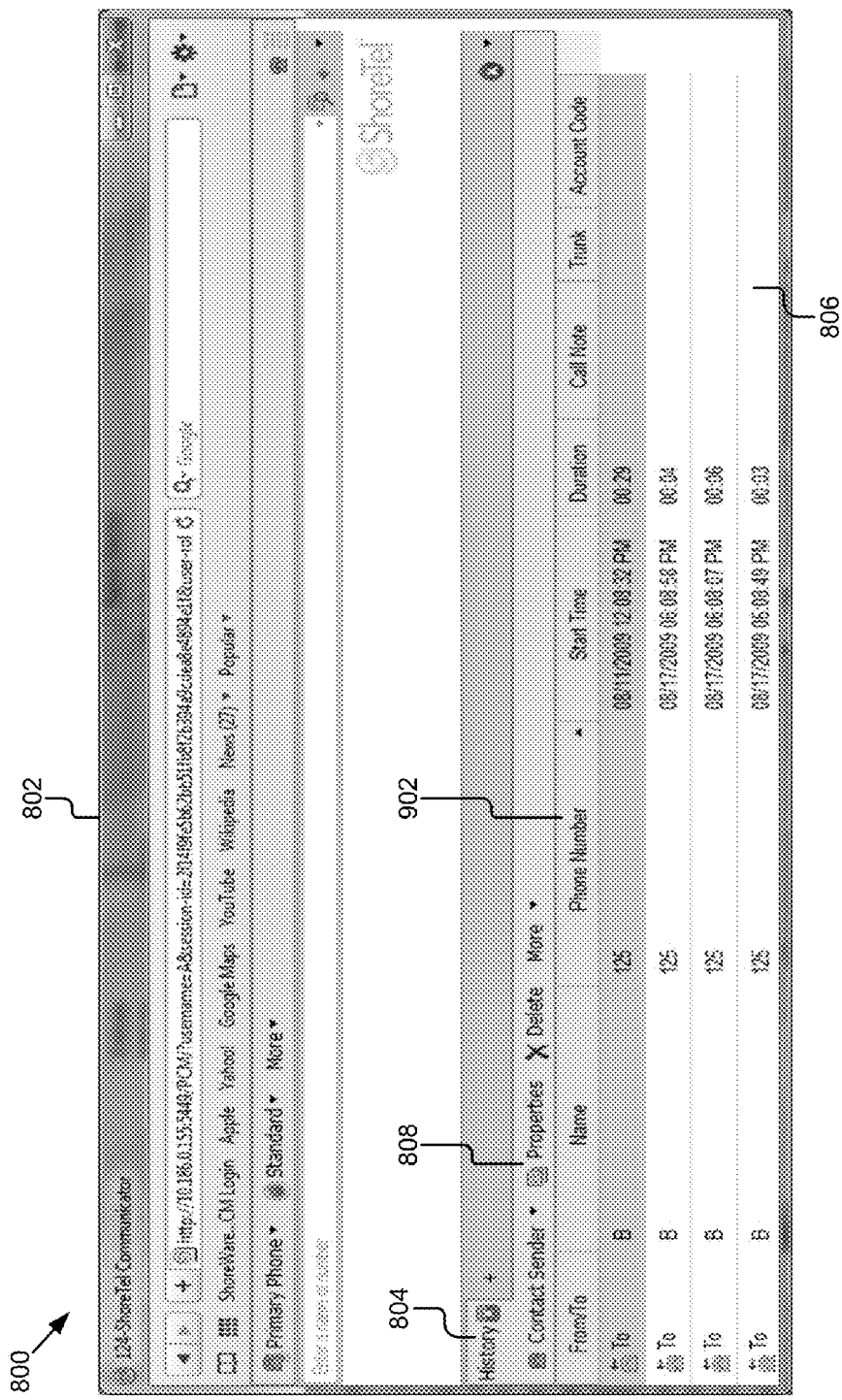
Figure 10:
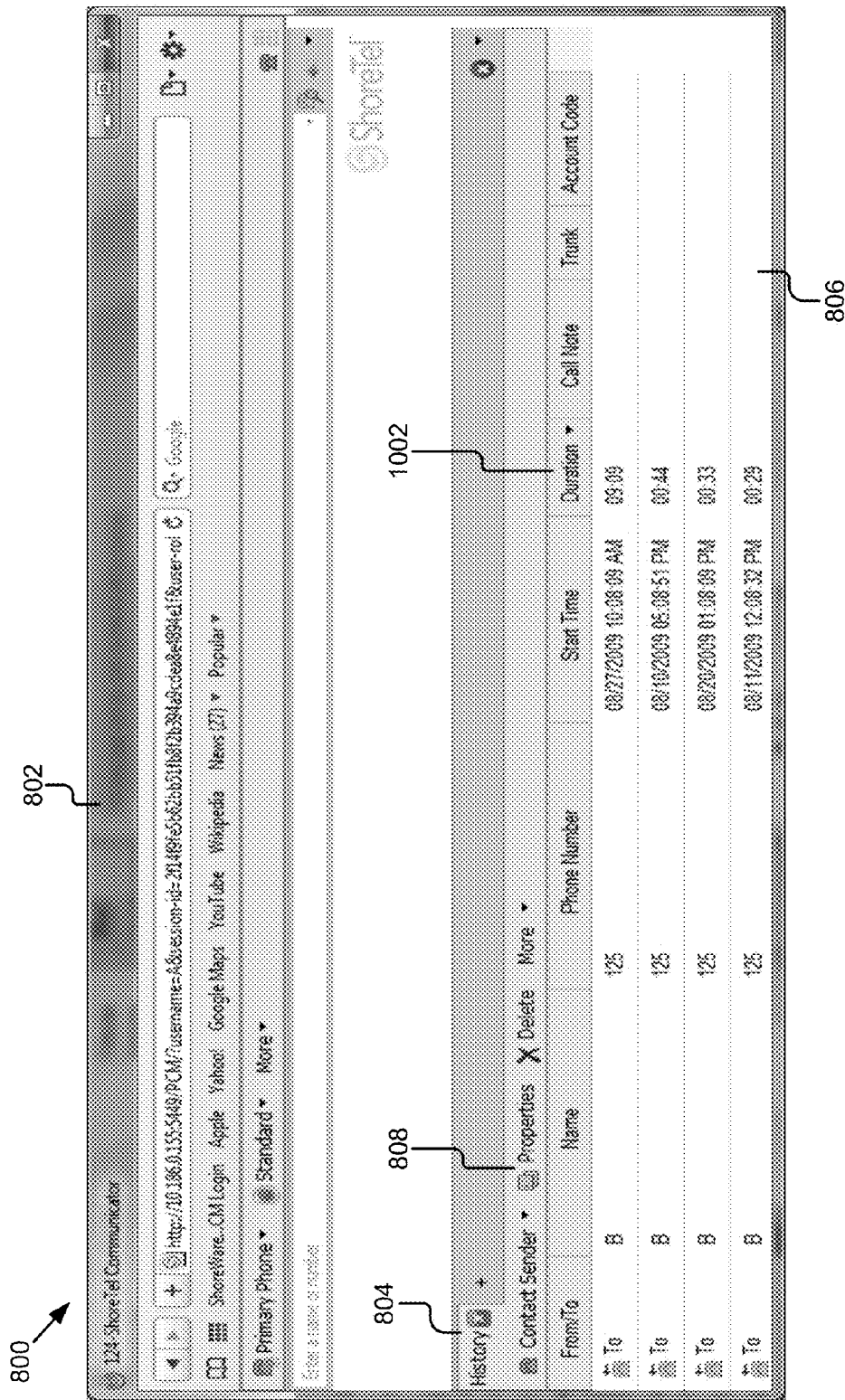

As shown in FIGS. 8-13, the graphic user-interface 800 is particularly advantageous because it allows the table 806 to be sorted according to any displayed attributes of the history record. The top row of the table 806 show the attributes, any of which can be selected to sort the data using that attribute. By selecting the attribute (one mouse click), the attributed is selected as the criterion for sorting, by selecting the attribute again (another mouse click), the sorting toggles from ascending or descending order. FIG. 9 illustrates one embodiment of the graphic user interface 800 where the table 806 is sorted by phone number 902. FIG. 10 illustrates one embodiment graphic user interface 800 where the table 806 is sorted by duration 1002 of the call.

Figure 11:
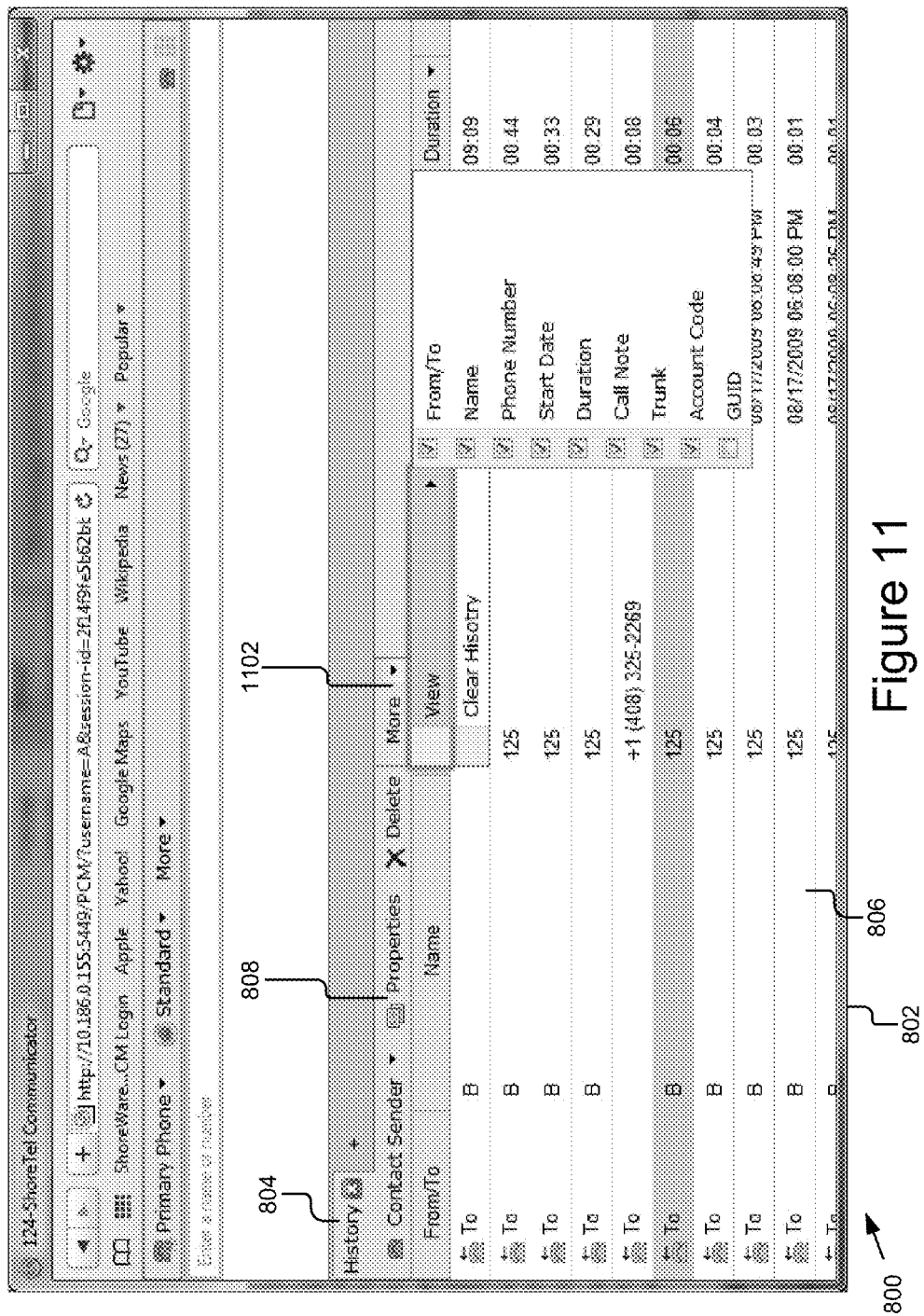

FIG. 11 illustrates one embodiment of the graphic user interface 800 showing selection of a function 1102 to modify the call history table 806 including selecting using menu items which attributes of the table 806 are displayed.

Figure 12:
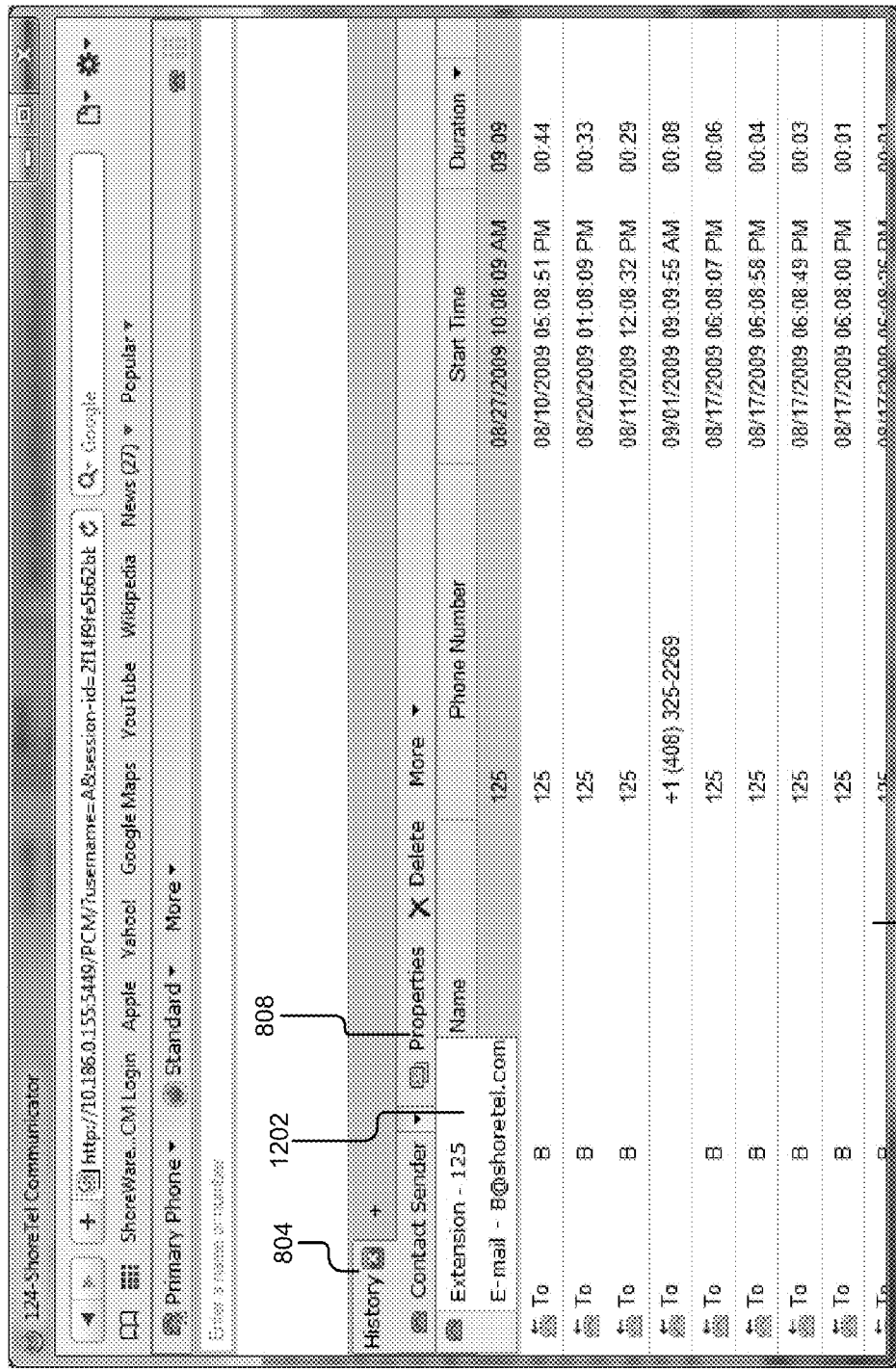

FIG. 12 illustrates one embodiment of the graphic user interface 800 showing selection of another function 1202 to contact the sender and the modification of the display to present different options of communications mechanisms to contact the sender. While the only options shown here are to contact the sender by return phone call to extension 125 or by return e-mail to a specified e-mail address, in other embodiments this pull down menu may provide various other ways in which to contact the sender such as instant messaging, calls to other phone numbers such as home phone numbers or mobile telephone numbers, leaving a voicemail etc.

Figure 13:
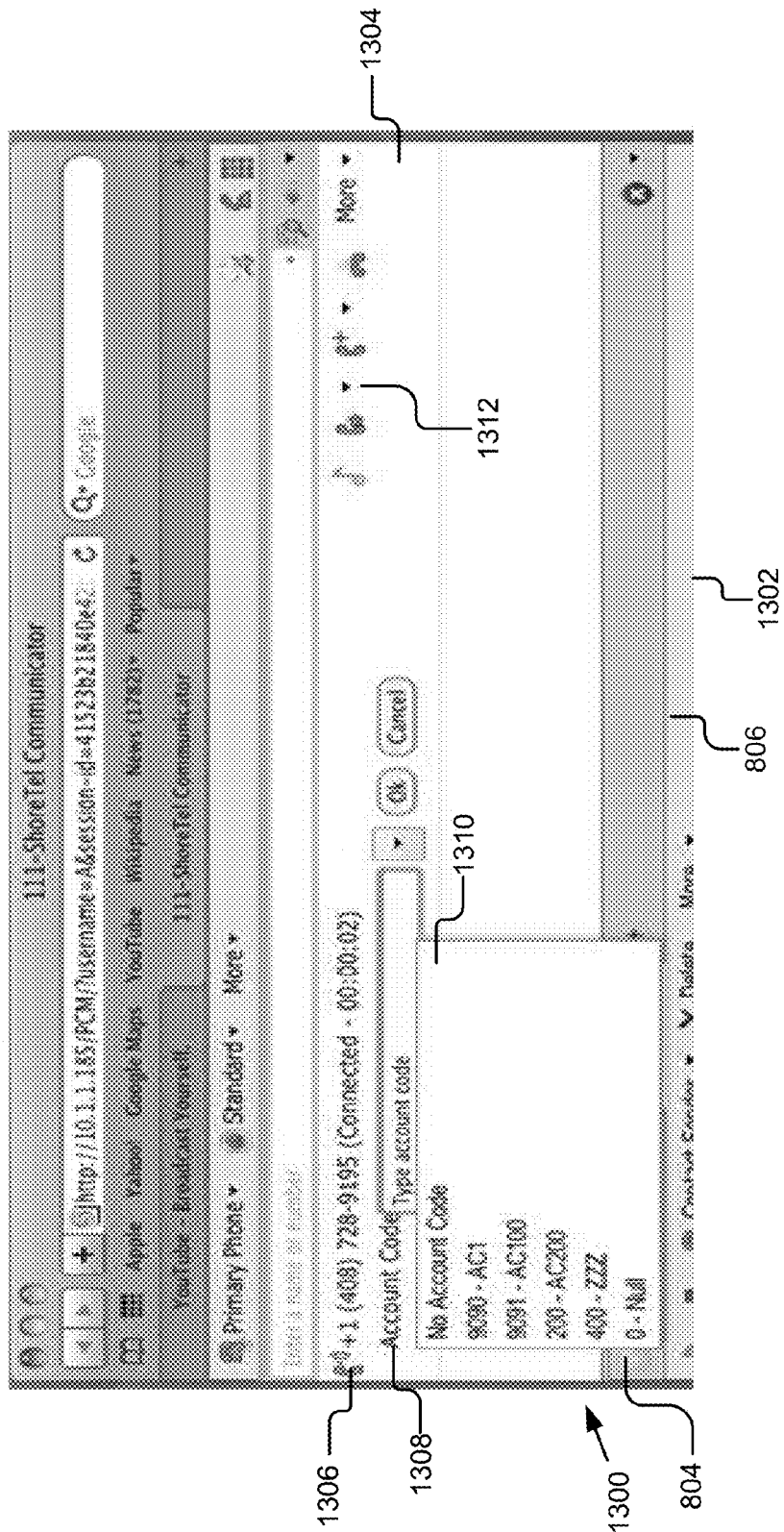

FIG. 13 illustrates one embodiment of the graphic user interface 1300 showing an active call cell 1304 used in conjunction with the call history table 806. The graphical user interface 1300 is defined by a window 1302 that includes the active call cell 1304 positioned above the history table 806. The active call cell 1304 is advantageous because it shows the current status of the user in juxtaposition to his/her call history table 806. The active call cell 1304 includes an icon 1306 and other call identifying information, and account code label 1308, account control buttons, and an account code pull down menu including recent accounts used by the user. In addition, the active call cell 1304 also includes a variety of additional icons 1312 representing additional actions that can be taken with the active call such as forwarding, voicemail, adding a caller to create a conference call, etc. In one embodiment, the user can select information in the call history by highlighting the row of the call history table 806 as shown in FIG. 8 through 12, and then initialize or place a call, after which the active call cell 1304 appears thereby allowing the user to access many additional telephony functions of the system in two or less clicks or mouse type input. Furthermore, the present invention is advantageous because the interface shown in FIG. 13 is presented regardless of the type of client device that the user is logged into to access the functionality of the VoIP system 100. In other words, whether the user is using the thin client 114, the personal call manager 118 or an IP phone, the user interface 1300 of FIG. 13 is presented to the user so that the user experiences a common look and feel regardless of the type of client device used to access the IP telephony system 100.

Figure 14:
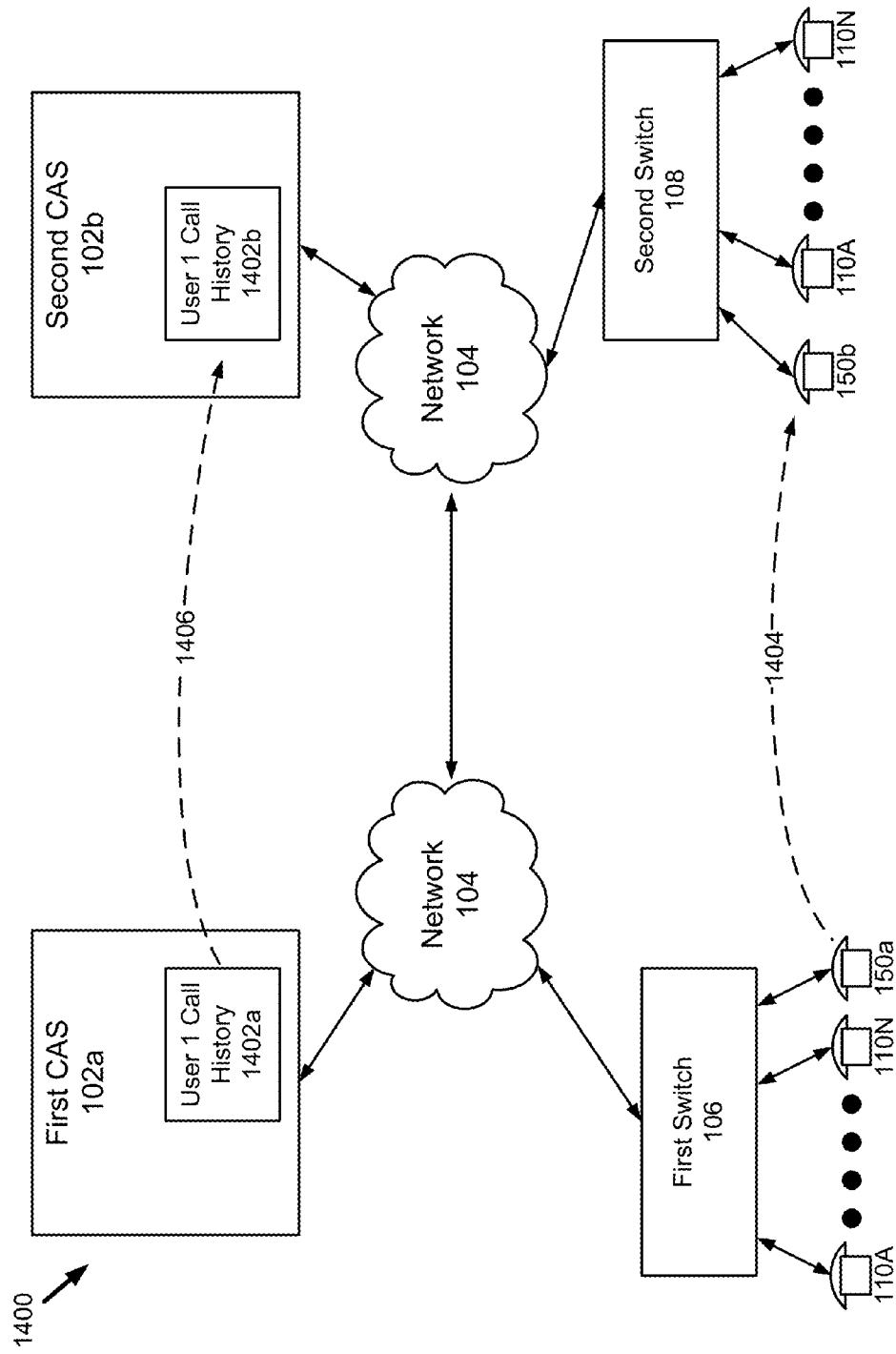
FIG. 14 is a block diagram of an embodiment of the system for enhanced call history illustrating the transfer of user information in accordance with the present invention.

Referring now to FIG. 14, a block diagram of another embodiment of the system 1400 for enhanced call history is shown. This embodiment illustrates a system 1400 that includes a plurality of call application servers 102a, 102b that are distributed within the system 1400. In the system 1400, the first call application server 102a is coupled to the network 104 and provides call history services for the first switch 106 and the plurality of phones 110A-110N, 150a while the second call application server 102b is coupled to the network 104 and provides call history services for the second switch 108 and the plurality of phones 110A-110N. Having a plurality of call application servers 102a, 102b makes the particular architecture of the present invention advantageously because it is scalable with the size of the IP telephony system 100. This is particularly important when the call history includes real-time data such as presence. Being able to have a plurality of call application servers 102a, 102b ensures that call history information can be delivered in real time to any endpoint that requests such information. The present invention is also advantageous because the call history for a particular user, user 1, can be migrated between the first call application server 102a and the second call application server 102b. For example, assume that user 1 has a call history 1402a that is stored at the first call application server 102a, that user one has an extension 150a coupled to first switch 106, and further assume that a wide area network connects the two network clouds 104. The first call application server 102a is responsible for making the call history 1402a of user 1 available. However, if at some point the extension 105a assigned to the user is moved from the first switch 106 to the second switch 108 as represented by extension 105b and diagrammatically shown by dashed line 1404, the present invention advantageously migrates the call history for the user 1402a to the second call application server 102b as represented by user 1 call history 1402b and diagrammatically shown by dashed line 1406. In one embodiment, this is accomplished by copying the history records for the first user from the first call application server 102a to the second call application server 102b. Still more particularly, this may be done by copying the history records from the history system 202 of the first call application server 102a to the history system 202 of the second call application server 102b. The result of copying is that the records from the first call application server 102a are merged with the records of the second call application server on 102b. In such a copying operation, the unique ID numbers for the history records may have to be changed so that they are consistent with unique IDs with in the history system 202 of the second call application server 102b. In one embodiment, the copying of user history file is done by a voicemail subsystem (not shown). The history system 202 in the first call application server 102a and the voicemail application collaborate because access to history file 1402a must be synchronized. The voicemail application cannot copy the history file 1402a until history system 202 is done with it. Similarly when the file 1402a is copied to a new machine, the voicemail application must notify the history system 202 of the second call application server 102b about this fact and after that merging of two files begins. In yet another embodiment, to avoid race conditions, if the second call application server 102b knows a file transfer was pending, it can abort the reception and send it's own file back to the first call application server 102a such that the file history 1402 is transferred from the first call application server 102a to the second call application server 102b and then back to the first call application server 102a (A-to-B-to-A scenario). In an A-to-B-to-C scenario, then the second call application server 102b could forward both its own file and A's file to a third call application server 102.

The migration of the call history 1402 from one server 102a to another 102b is particularly advantageous because from the perspective of the end-user no history information is lost. While there might be a temporary unavailability of the call history 1402 during the copying operation, the call history 1402 is accessible when multiple types of clients both before and after migration from the first call application server 102b to the second call application server 102b.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A communications system for providing history information associated with multiple endpoints, comprising:
   a telephony system configured to:
      monitor the multiple endpoints, and
      obtain the history information associated with the multiple endpoints, the history information comprising a plurality of records each associated with a user and including user presence information;
   a history system configured to:
      receive and store the history information from the telephony system,
      receive requests for the history information, each request for the history information of a particular user and received from a requesting endpoint of the multiple endpoints, a first portion of the requests received from a first portion of the multiple endpoints, and
      for each of the first portion of the requests, provide the records associated with the particular user to the requesting endpoint.

2. The communications system of claim 1 wherein a second portion of the requests are received from one of a second portion of the multiple endpoints, the system further comprising:
   a history cache configured to:
      receive and store the history information from the history system,
      filter the records in response to the second portion of the requests, and
      for each of the second portion of the requests, provide the filtered records associated with the particular user to the requesting endpoint.

3. The communications system of claim 1 wherein the first portion of the multiple endpoints include at least one of an IP phone, a personal call manager, or a thick client.

4. The communications system of claim 2 wherein the second portion of the multiple endpoints include at least one of a mobile endpoint or a thin client using a web browser application.

5. The communications system of claim 1 wherein the user presence information includes real time status information.

6. The communications system of claim 1 wherein the history information includes at least one of voicemail information, instant messaging information, email information, directory information, contact information, missed call information, received call information, or placed call information.

7. The communications system of claim 2 wherein the history system is further configured to monitor for events affecting the history information stored in the history cache and update the history cache in real time if events affecting the history information are received.

8. The communications system of claim 1 wherein the requests for the history information are requests to provide a number of the records associated with the particular user.

9. The communications system of claim 2 wherein the history cache is further configured to store the history information associated with the particular user and provide a page view of the filtered records associated with the particular user.

10. A method for providing history information associated with multiple endpoints in a communications system, the method comprising:
    at a telephony system:
       monitoring the multiple endpoints;
       obtaining the history information associated with the multiple endpoints, the history information comprising a plurality of records each associated with a user and including user presence information; and
       sending the history information to a call application server;
    at the call application server:
       receiving the history information from the telephony system and storing the history information at a history system;
       receiving a first request for the history information of a first user from a first one of the multiple endpoints; and providing the records associated with the first user from the history system to the first one of the multiple endpoints.

11. The method of claim 10 further comprising:
receiving a second request for the history information of a second user from a second one of the multiple endpoints;
filtering the records associated with the second user at a history cache in response to the second request; and
providing the filtered records associated with the second user from the history cache to the second one of the multiple endpoints.

12. The method of claim 10 wherein the first one of the multiple endpoints is at least one of an IP phone, a personal call manager, or a thick client.

13. The method of claim 11 wherein the second one of the multiple endpoints is at least one of a mobile endpoint or a thin client using a web browser application.

14. The method of claim 10 wherein the user presence information includes real time status information.

15. The method of claim 10 wherein the history information includes at least one of parties to a call, starting time of a call, or duration of a call.

16. The method of claim 11 wherein providing the filtered records from the history cache includes providing a page view of the filtered records.

17. The method of claim 11 further comprising monitoring the multiple endpoints for events that affect the history information stored in the history cache and updating the history cache in real time if events affecting the history information are received.

18. The method of claim 10 wherein the history information includes at least one of voicemail information, instant messaging information, email information, directory information, contact information, missed call information, received call information, or placed call information.

19. A method for obtaining history information associated with a user in a communications system, the method comprising:
at a first endpoint:
logging in to the first endpoint as the user;
using the first endpoint to perform a first call function, where a record of the first call function is associated with the user and added to the history information;
at a second endpoint:
logging in to the second endpoint as the user, the second endpoint being different from the first endpoint;
using the second endpoint to perform a second call function, where a record of the second call function is associated with the user and added to the history information;
using the second endpoint to request the history information associated with the user; and
receiving, at the second endpoint, the history information associated with the user, the history information associated with the user including the record of the first call function, the record of the second call function, and presence information of the user.

20. The method of claim 19 wherein the second endpoints is at least one of a mobile endpoint or a thin client using a web browser application.

21. The method of claim 19 wherein the first call function and the second call function each include at least one of sending or receiving an instant message, sending or receiving an email message, or sending or receiving a call.

* * * * *